3,520,380
MAXIMUM VEHICLE SPEED LIMITER

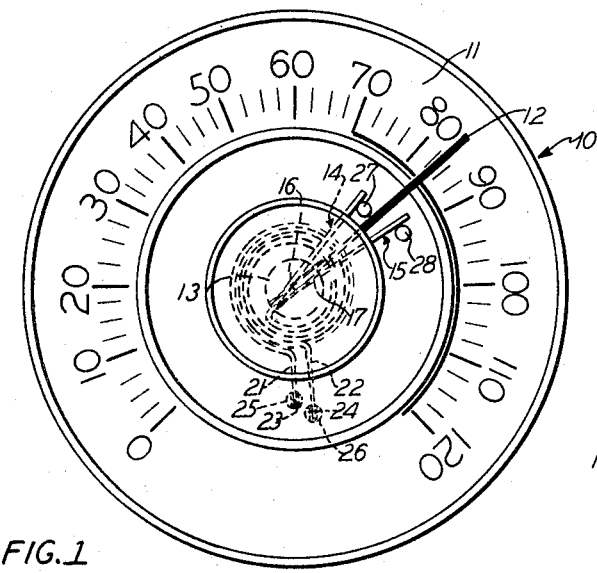
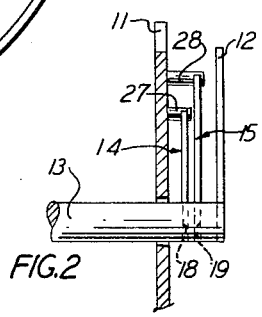
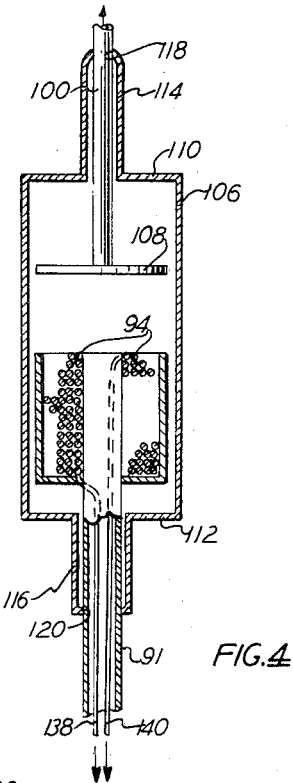
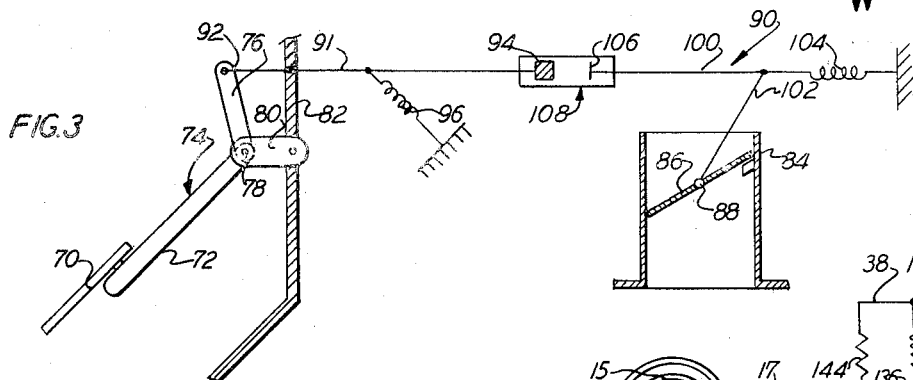
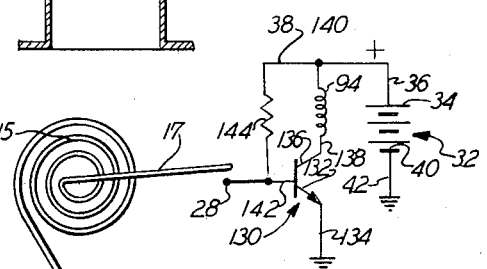
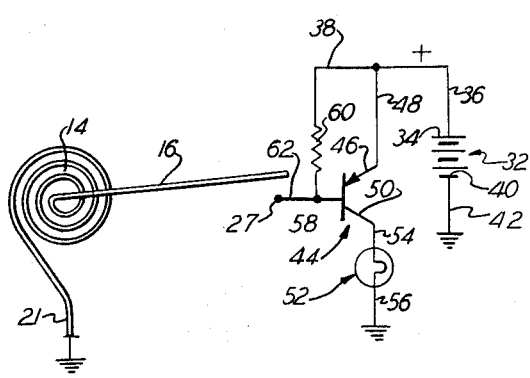
BERNARD G. RADIN
LAWRENCE J. VANDERBERG
INVENTORS
BY John R. Faulkner
Keith L. Zerschling
ATTORNEYS

United States Patent Office 3,520,380
Patented July 14, 1970

Bernard G. Radin, Oak Park, and Lawrence J. Vanderberg, Ann Arbor, Mich., assignors to Ford Motor Company, Dearborn, Mich., a corporation of Delaware
Filed June 13, 1968, Ser. No. 736,836
Int. Cl. B60k 31/00
U.S. Cl. 180—106                                    12 Claims

ABSTRACT OF THE DISCLOSURE

In a maximum vehicle speed limiter, vehicle speed is limited by controlling the length of the linkage between the throttle or accelerator pedal and the carburetor throttle by the action of an electromagnetic solenoid. During normal operation a solenoid attached to one member of the throttle linkage is energized and it holds a keeper attached to another member of the vehicle linkage in engagement with it thereby providing normal operation of the vehicle. When a predetermined speed is reached, a circuit is closed to energize a warning lamp that alerts the vehicle operator that he is approaching a predetermined maximum speed level. When the predetermined speed level is reached, the circuit to the solenoid is opened thereby de-energizing it and lengthening the linkage between the accelerator pedal and the carburetor throttle by permitting the solenoid and the keeper to separate. This action permits the carburetor throttle return spring to return the carburetor throttle to its closed position and, as a result, the speed of the vehicle is reduced. In order for the vehicle operator to return control of the speed of the vehicle to the movement of the accelerator pedal, he must remove his foot from the accelerator pedal so that the solenoid and the keeper again come into engagement. The electromagnetic field generated by the solenoid is sufficient to keep the solenoid and keeper engaged, but it is not sufficient to attract the keeper to the solenoid once contact has been broken between these two elements.

BACKGROUND OF THE INVENTION

In prior art devices known to the applicant, various solenoid devices have been provided in the linkage between the accelerator pedal and the carburetor throttle that will limit the maximum speed of the vehicle. These devices, however, require a high current flow through the solenoid and in some the solenoid is energized when the required speed of the vehicle is reached thereby acting on the portion of the linkage connected to the carburetor throttle to move it toward its closed position when a predetermined vehicle speed is reached.

The present invention differentiates from the prior art devices by providing an extremely simple and inexpensive means for controlling the maximum speed of a motor vehicle. This means comprises a solenoid attached to one movable member of the linkage connecting the accelerator or throttle pedal with the carburetor throttle and a keeper attached to another movable member in the linkage. The solenoid may be attached to either the member coupled to the accelerator or throttle pedal or to the member coupled to the carburetor throttle. The solenoid is normally energized at speeds below a maximum predetermined speed and the keeper engages the solenoid so that the solenoid and keeper are engaged to produce a throttle linkage of a predetermined length.

When the vehicle reaches a maximum predetermined speed, means coupled to the speedometer of the vehicle opens the circuit to the solenoid thereby de-energizing the solenoid and the solenoid and keeper may separate and slide relative to each other. Such action permits a lengthening of the throttle linkage connecting the accelerator pedal and the carburetor throttle whereby the return spring connected to the carburetor throttle is permitted to close the carburetor throttle. As a result, the speed of the vehicle is reduced sharply to a speed below the predetermined speed. In order for the operator of the vehicle to again regain control of the speed of the vehicle, he must remove his foot from the throttle or accelerator pedal so that the accelerator or pedal returns to its normal unactuated position. This action permits the solenoid to again engage the keeper and to be energized by the circuitry coupled to the speedometer of the vehicle.

Means are also coupled to the speedometer to energize a warning lamp at some speed below the maximum predetermined speed level mentioned above whereby the vehicle operator is warned that he is approaching the maximum predetermined speed level where the above described means will cause the solenoid to be de-energized complicated mechanism is provided.

The amount of current flowing through the solenoid is sufficient to keep the solenoid and keeper engaged, but is not sufficient to attract the keeper to the solenoid. As a result, a very minimum of current is consumed. Moreover, in the invention the number of parts employed is kept to a bare minimum and a very inexpensive and uncomplicated mechanism is provided.

An object of the invention is the provision of an extremely uncomplicated and inexpensive mechanism for controlling the speed of an automotive vehicle.

A further object of the invention is the provision of an uncomplicated and inexpensive means for limiting the maximum speed of a vehicle in which the speed of the vehicle is sharply reduced when the speed of the vehicle reaches a predetermined maximum speed.

Still another object of the invention is the provision of an uncomplicated and inexpensive means for limiting the maximum speed of the vehicle in which the speed of the vehicle is sharply reduced when the vehicle speed reaches a predetermined maximum speed level and in which the vehicle operator must remove his foot from the accelerator pedal in order to restore control of the speed of the vehicle to the vehicle operator after such sharp reduction in speed.

Other objects and attendant advantages of the invention will become more apparent as the specification is considered in connection with the attached drawings in which:

FIG. 1 is a front elevational view of a conventional speedometer with portions in dotted lines to show the means for controlling circuits that give a warning to a vehicle operator that he is approaching a maximum predetermined speed and for reducing the speed of the vehicle below a predetermined maximum speed when that speed is reached;

FIG. 2 is a partial side elevational view of the speedometer shown in FIG. 1;

FIG. 3 discloses a throttle linkage between the accelerator or throttle pedal and the carburetor throttle in an automotive vehicle that incorporates the maximum speed control mechanism of the present invention;

FIG. 4 is an enlarged view of the solenoid and keeper shown in FIG. 3 and positioned in the throttle linkage;

FIG. 5 is a circuit diagram showing the circuit for giving a warning when the vehicle is approaching a maximum predetermined speed; and FIG. 6 is a circuit diagram of a circuit that will de-energize the solenoid of the present invention and return the speed of the vehicle to a speed below a maximum predetermined speed level.

Referring now to the drawings in which like reference numerals designate like parts throughout the several views thereof, there is shown in FIGS. 1 and 2 a conventional speedometer 10 having an indicator dial 11 and a pointer 12 driven by a conventional eddy current cup device. The output shaft 13 to which the pointer 12 is attached has a first hair spring 14 and a second hair spring 15 attached thereto. This attachment may be accomplished by passing straight portions 16 and 17, respectively, of each of the hair springs 14 and 15 through spaced bores 18 and 19 in the speedometer output shaft 13 at an angle substantially perpendicular to the longitudinal axis of the speedometer shaft. The other ends 21 and 22 of the hair springs 14 and 15, respectively, are anchored with respect to the indicator dial 11 by anchoring them in slots 23 and 24 in pins 25 and 26 that are affixed to the speedometer dial.

The ends 16 and 17 of the hair springs 14 and 15, respectively, are adapted to engage pins 27 and 28, respectively, that are affixed to the speedometer dial 11 to thereby close electrical circuits that are described in greater detail below. For this purpose, the two pins 27 and 28 are circumferentially and radially spaced on the speedometer dial with respect to each other and with respect to the axis of the speedometer output shaft 13. Moreover, the axial length of the pin 27 is shorter than the axial length of the pin 28 to conform to the axial spacing of the two hair springs 14 and 15 along the axis of the speedometer shaft 13 and so that the end 17 of spring 15 may pass over the pin 27 and not engage it as the speed of the vehicle increases and the speedometer shaft 13 is rotated in a clockwise direction, as shown in FIG. 1. Moreover, as shown in this figure, the pin 27 is positioned in the speedometer dial 11 so that the end 16 of spring 14 will engage it when the speed of the vehicle reaches 80 miles per hour, while the pin 28 is positioned so that end 17 of spring 15 will engage it when the speed of the vehicle reaches 90 miles per hour.

Referring now to FIG. 5, there is shown a circuit diagram of a circuit that will be energized when the speed of the vehicle reaches 80 miles per hour and the end 16 of the hair spring 14 comes into engagement with the pin 27. This circuit comprises a source of electrical energy in the form of storage battery 32 of the motor vehicle in which the mechanism of this invention is mounted. The storage battery 32 has a positive terminal 34 connected through lead 36 to a lead 38 and a negative terminal 40 connected to ground through a lead 42.

A transistor 44 of the NPN type has an emitter electrode 46 connected to lead 38 through a lead 48, a collector electrode 50 connected to one terminal of a warning lamp 52 through a lead 54. The other terminal of the warning lamp 52 is connected to ground through a lead 56. The base electrode 58 of transistor 44 is connected to lead 38 through a resistor 60 for providing proper bias between the emitter electrode 46 and the base electrode 58.

The base electrode 58 is connected through a lead 62 with the pin 27 positioned in the indicator dial 11. FIG. 5 discloses the hair spring 14 that is attached to the speedometer shaft 13 with the end portion 16 thereof located so that it may engage the pin 27. The end 21 of spring 14 is shown connected to ground and this is accomplished by providing a ground connection to the pin 25 located in the indicator dial 11.

It may be readily appreciated that in the operation of the circuit shown in FIG. 5, the transistor will be in its nonconducting state when the end 16 of the spring 14 is out of contact with the pin 27 since no base current can flow out of the base 58. When the end 16 of the spring 14, however, comes into contact with the pin 27, a current path is provided from the base 58 to ground through the pin 27, the end 16, the main body and the end 21 of spring 14 and the pin 25. As a result, when the end 16 of spring 14 comes into contact with the pin 27, the transistor 44 is switched to its conducting state thereby energizing and illuminating the warning lamp 52. As previously stated, the pin 27 is positioned at the 80 mile per hour mark on the indicator dial 11 so that when this speed is reached, the transistor 44 is switched to its conducting state and the warning lamp 52 is energized. This provides a warning to the vehicle operator that he has reached a predetermined speed level which for illustrative purposes has been set at 80 miles per hour. It is, of course, obvious that the speed warning may be given at any other speed by merely locating the pin 27 in a proper location on the indicator dial 11.

Referring now to FIG. 3 there is shown in schematic form a mechanism which may be employed to limit the maximum vehicle speed of an automotive vehicle using an internal combustion engine. In this figure, an accelerator or throttle pedal 70 is shown that is attached to one arm 72 of an accelerator lever 74. The other arm 76 of the lever 74 is positioned at an acute angle with respect to the first arm 72. The lever 74 is pivotally mounted at the junction of arms 72 and 76 by means of a pin and bearing arrangement 78 to a support member 80 that is suitably positioned on the fire wall 82 of the vehicle. FIG. 3 also discloses a carburetor induction passage 84 having a throttle or plate 86 pivotally mounted therein at 88. A linkage means, generally designated by the numeral 90, is employed to correct the lever 74 and, more particularly, the end of arm 76 with the carburetor throttle or plate 86. This linkage means comprises a first member 91 having one end 92 connected to the end of the arm 76 of the lever 74 and having the other end thereof connected to a solenoid 94. A spring means 96 is affixed to the member 91 to bias or urge the member 91 to the right, as shown in FIG. 3, and the lever 74 in a clockwise direction. As a result, when no pressure is applied to the throttle or accelerator pedal 70, the lever 74 will be rotated into its most clockwise position where the pedal 70 is located in its most remote position with respect to the floor board 98 of the motor vehicle.

The linkage means 90 has a second member 100 suitably affixed to the carburetor throttle or plate 86 and, as shown in the drawing which is schematic only, another link 102 is attached to the link 100 and to the pivot means 88. The link members 100 and 102 are urged to the right, as shown in FIG. 3, by means of a tension spring 104 thereby urging the throttle or plate 86 in a clockwise direction and into a closed position, as shown in the figure, where the throttle or plate 86 substantially closes the induction passage 84 to the carburetor of the internal combustion engine mounted in the motor vehicle. It should be realized that the link 102 and the spring are shown in schematic form only and that any other spring means may be employed to urge the throttle or plate 86 into its closed position as shown in FIG. 3.

The end of the member 100 remote from the spring 104 and the link 102 has a ferromagnetic keeper 106 positioned thereon. The solenoid 94 and the keeper 106 are mounted for reciprocatory movement in a housing 108. The housing 108, the solenoid 94 and the keeper 106 may be of generally cylindrical or annular configuration, as best shown in FIG. 4. The housing 108 has end walls 110 and 112 which have tubular extensions 114 and 116 positioned thereon, respectively. The tubular extension 114 has an opening 118 positioned therein for reception of the link member 100 and provides a guide means for the link 100 and the keeper 106 so that the keeper 106 may be slidably positioned within the housing 108 at different locations. The end wall 110 provides a stop means for limiting the movement of the keeper 106 in the upward direction, as shown in FIG. 4, or to the right, as shown in FIG. 3. The tubular extension 116 also has an opening 120 positioned therein for the reception of the link member 91 and this opening provides a guide means for the reciprocatory action of the link member 91 within the housing 108, with the end wall 112 providing a stop means for limiting the movement of the solenoid 94 in the housing 108. As shown in FIG. 4, the link member 91 may be comprised of a tubular material having an axial opening extending for at least a portion of its length to provide a means for connecting lead wires to the solenoid 94.

The solenoid 94 and keeper 106 are shown in their separated positions both in FIG. 3 and in FIG. 4 and this will occur when the vehicle speed has reached a predetermined maximum level where the solenoid 94 is de-energized. When this occurs the keeper and solenoid will come out of engagement with respect to one another under the urging of the biasing spring 104 which returns the throttle or plate 86 disposed in the carburetor induction passage 84 to its closed position.

When the motor vehicle, however, is first started and prior to the time that the operator places his foot on the accelerator pedal 70, the keeper 106 and the solenoid 94 will be in engagement with one another and the solenoid will be suitably energized. The energization of the solenoid holds the keeper in engagement with the solenoid during vehicle operations until such time as the solenoid is de-energized when the vehicle speed reaches some maximum predetermined level.

The circuit for energizing the solenoid 94 is shown in FIG. 6. In this circuit, the source of electrical energy or storage battery of the automotive vehicle is again designated by the numeral 32, as in FIG. 5. The lead 38, shown in FIG. 5, and the lead 38, shown in FIG. 6, may be the same lead and the connection of the battery to this lead is the same as shown in FIG. 5. In FIG. 6, a transistor 130 of the PNP type is shown having an emitter electrode 132 connected to ground by a lead 134. The collector electrode 136 is connected to one end of the solenoid 94 by a lead 138, while the other end of the solenoid 94 is connected to lead 38 through a lead 140. These leads 138 and 140 are also shown in FIG. 4 as extending through the axial opening in the link member 91.

The base electrode 142 of the transistor 130 is connected to the lead 38 through a resistor 144 which applies the proper amount of bias to the base electrode. Thus, with the circuit shown in FIG. 6, the transistor 130 is biased to its conducting state and current flows through the solenoid 94 in series with the output electrodes, collector 136 and emitter 132, of transistor 130.

The transistor 130 will remain in its conducting state until the base 142 is connected to ground through the arrangement shown in FIG. 6. FIG. 6 discloses the hair spring 15 having the end portion 17 which is positioned through the driven shaft 13 of the speedometer 10 and end portion 22 which is connected to ground through the pin 26 positioned in the indicator dial 11. When the speed of the automotive vehicle in which the present invention is mounted reaches some predetermined maximum level, for example 90 miles per hour as illustrated, the end 17 of the spring 15 engages the pin 28 thereby connecting the base 142 of the transistor 130 to ground. This action places the base and the emitter of the transistor 130 at the same potential thereby switching the transistor 130 to its nonconducting state and thereby de-energizing the solenoid 94.

When the solenoid 94 is de-energized, the keeper 106 and the solenoid 94 separate, as shown in FIG. 3, under the urging of the spring 104; and the carburetor throttle or plate 86 is rotated into its closed position by the action of spring 104. This, of course, immediately reduces the speed of the motor vehicle without the further action on the part of the vehicle operator. When the vehicle speed is reduced below the maximum predetermined speed level, the vehicle operator may restore control of the positioning of the carburetor throttle or plate 86 to the accelerator or throttle pedal 70 by merely letting up or taking the pressure off the pedal 70. The spring 96 will thereafter rotate the lever 74 in a clockwise direction and the solenoid 94 will come into engagement with the keeper 106. Also, as the speed of the motor vehicle is reduced from the predetermined maximum speed level, the end 17 of hair spring 15 will come out of engagement with the pin or contact 28 thereby switching the transistor 130 to its conductive state and causing the solenoid 94 to be energized.

The current flow through the solenoid 94 when the transistor 130 is energized is set so that it will keep the keeper 106 in engagement with the solenoid 94 so long as current flows through the solenoid. However, the current is not of sufficient magnitude to attract the keeper to the solenoid. Thus, the keeper 106 and the link members 102, 100 and the throttle or plate 86 will remain in a position shown in FIG. 3 despite the fact that the solenoid 94 may be in its energized state. As previously pointed out, in order to restore the action of the solenoid with respect to the keeper 106 so that they will be kept in engagement by current flow through the solenoid 94, it is necessary that these two members, the keeper and the solenoid, come into contact with one another. This may be accomplished only by letting up on the accelerator or throttle pedal 70 so that the solenoid 94 moves to the right to a sufficient extent for the solenoid to engage the keeper.

It can be appreciated from the drawings and the above description that the present invention provides a very uncomplicated and inexpensive means for limiting the maximum speed of a motor vehicle at some predetermined maximum speed level and for causing a warning to the vehicle operator when the speed of the vehicle reaches some predetermined speed level lower than the maximum speed level described above.

It can also be appreciated that in operation the solenoid draws very little current since its function is merely to keep the keeper in engagement with it when the solenoid is energized. The current through the solenoid is purposely kept at this level to minimize power consumption from the electrical system of the motor vehicle in which it is positioned.

The invention disclosed will have many modifications which will be apparent to those skilled in the art in view of the teachings of this specification. It is intended that all modifications which fall within the true spirit and scope of this invention be included within the scope of the appended claims.

What is claimed is:

1. In an automotive vehicle the combination comprising a throttle pedal, a carburetor, a carburetor throttle, linkage means interconnecting the throttle pedal and the carburetor throttle, said linkage means including a solenoid and a keeper movable with respect to one another and said linkage means in substantially an axial direction, means for energizing said solenoid and thereby keeping said keeper in engagement with said solenoid at speeds below a predetermined speed level, means coupled to said last mentioned means and responsive to the speed of the vehicle for de-energizing said solenoid when the speed of the vehicles reaches said predetermined speed level, and means associated with said linkage means for separating said solenoid and said keeper when said solenoid is de-energized and for closing said carburetor throttle, and means for keeping said solenoid and said keeper separated until said throttle pedal is returned to its normal unactuated position whereby said solenoid again engages the keeper and speed of the vehicle is returned to the control of the vehicle operator.

2. The combination of claim 1 in which said linkage means is divided into two portions, one end of one of said portions carrying said solenoid and the juxtaposed end of the other portion carrying said keeper.

3. The combination of claim 2 in which spring means urge said two portions in the same direction with one of said portions being coupled to said throttle pedal and the other of said portions being connected to said carburetor throttle.

4. The combination of claim 3 in which said spring means urge said throttle pedal and said carburetor throttle to their respective closed positions.

5. The combination of claim 4 in which said solenoid and said keeper are positioned in a housing, having opposed end walls, one of said portions of said linkage means extending in slidable relationship through one of said end walls and the other one of said portions extending in slidable relationship through the other of said end walls, said keeper engaging one of said end walls and said solenoid engaging the other of said end walls when said solenoid is de-energized to limit the extent of the lengthening of said throttle linkage when said solenoid is de-energized.

6. In a speed limiting device for an automotive vehicle, the combination comprising a throttle pedal, a carburetor throttle, a throttle linkage comprised of a first portion coupled to said throttle pedal and a second portion coupled to said carburetor throttle, first spring means operatively coupled to said throttle pedal for urging said throttle pedal to its unactuated position, second spring means operatively coupled to said carburetor throttle for urging said carburetor throttle to its closed position, said first portion and said second portion of said throttle linkage being axially aligned, the juxtaposed ends of said first and second portions of said throttle linkage having a solenoid and a keeper attached thereto, respectively, electrical circuit means coupled to said solenoid for energizing said solenoid, one of said spring means urging said coil and said keeper into engagement to thereby define a throttle linkage of a given length, and means coupled to said electrical circuit means and responsive to a predetermined upper speed level of the vehicle for opening said electrical circuit to said solenoid and de-energizing said solenoid whereby said solenoid and said keeper separate to permit said carburetor throttle to be returned toward its closed position under the urging of said second spring means.

7. The combination of claim 6 in which the magnetic field generated by said solenoid is sufficient to keep said keeper in engagement with said coil when said solenoid is energized, but is insufficient to attract said keeper into engagement with said solenoid when said keeper is disengaged from said coil.

8. The combination of claim 6 in which said coil and said keeper are positioned in a housing, said housing having end walls through which said portions of said throttle linkage extend in sliding engagement therewith.

9. The combination of claim 8 in which the end walls of said housing provide stop means for said coil and said keeper to limit the extent of the lengthening of said throttle linkage.

10. The combination of claim 6 in which said means responsive to the speed of the vehicle for opening said electrical circuit means connected with said solenoid comprise a pair of normally open contacts that are closed by the speedometer mechanism of the vehicle when said predetermined speed level is reached.

11. The combination of claim 6 in which there is provided a warning lamp, and means are coupled to said warning lamp for energizing said warning lamp at a predetermined speed level of the vehicle at a speed below said predetermined upper speed level at which the opening of the circuit to said solenoid occurs.

12. The combination of claim 6 in which said throttle pedal must be returned to its normal unactuated position in order for said coil to again engage said keeper.

References Cited

UNITED STATES PATENTS

| 2,127,454 | 8/1938  | Wolf et al.      | 180—110   |
| 2,188,704 | 1/1940  | Claytor          | 123—102   |
| 2,193,224 | 3/1940  | Cowles           | 180—105   |
| 2,236,145 | 3/1941  | Kolb             | 180—110 X |
| 2,265,524 | 12/1941 | Fruth            | 180—110 X |
| 2,454,659 | 11/1948 | Leonard          | 123—102 X |
| 3,077,239 | 2/1963  | Simas            | 180—109   |
| 3,164,220 | 1/1965  | Wurgler          | 180—110   |
| 3,331,478 | 7/1967  | Trifiletti et al.| 192—3     |

KENNETH H. BETTS, Primary Examiner

U.S. Cl. X.R.

123—102; 180—110; 340—264